(12) United States Patent
Jang

(10) Patent No.: US 12,729,734 B2
(45) Date of Patent: Sep. 8, 2026

(54) ZERO-DRAG CONTROL DEVICE OF EMB SYSTEM AND ZERO-DRAG CONTROL METHOD USING THE SAME

(71) Applicant: HL MANDO CORPORATION, Pyeongtaek-si (KR)

(72) Inventor: Jaehoon Jang, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 483 days.

(21) Appl. No.: 18/233,113

(22) Filed: Aug. 11, 2023

(65) Prior Publication Data

US 2024/0309924 A1 Sep. 19, 2024

(30) Foreign Application Priority Data

Mar. 13, 2023 (KR) ........................ 10-2023-0032801

(51) Int. Cl.

*F16D 65/38* (2006.01)
*B60T 8/171* (2006.01)
*B60K 26/02* (2006.01)
*B60T 7/04* (2006.01)

(52) U.S. Cl.

CPC .............. *F16D 65/38* (2013.01); *B60T 8/171* (2013.01); *B60K 26/02* (2013.01); *B60T 7/042* (2013.01); *B60T 2201/02* (2013.01); *B60T 2210/12* (2013.01); *B60T 2210/32* (2013.01); *B60T 2220/04* (2013.01); *B60T 2250/00* (2013.01); *B60T 2250/04* (2013.01); *B60T 2270/82* (2013.01); *F16D 2065/386* (2013.01)

(58) Field of Classification Search

CPC .... F16D 65/38; F16D 2065/386; B60T 8/171; B60T 8/172; B60T 7/042; B60T 2210/12; B60T 2210/32; B60T 2220/04; B60T 2250/00; B60T 2250/04; B60T 17/221; B60T 2270/82; B60K 26/02

USPC ......... 303/3, 15, 20; 701/70–72; 188/1.11 E, 188/156–162

See application file for complete search history.

(56) References Cited

U.S. PATENT DOCUMENTS 5,957,246 A * 9/1999 Suzuki ...................... B60T 7/12 188/196 R
6,250,436 B1 * 6/2001 Oikawa ................ B60T 13/741 188/162
12,139,115 B2 * 11/2024 Jang ...................... B60T 13/741
(Continued)

FOREIGN PATENT DOCUMENTS

JP 2004-345393 A 12/2004
KR 10-2016-0099950 A 8/2016
(Continued)

OTHER PUBLICATIONS

Office Action From Korean Patent Office Dated Nov. 30, 2025 Issued for Korean Patent Application No. 10-2023-0032801.

*Primary Examiner* — Christopher P Schwartz
(74) *Attorney, Agent, or Firm* — Harvest IP Law, LLP

(57) ABSTRACT

The present disclosure relates to a zero-drag control device of an EMB system and a zero-drag control method using the same, which effectively control a drag phenomenon. By adjusting a gap between a disk and a pad in consideration of not only a braking intention through a brake pedal but also an accelerating intention through an accelerator pedal, the drag phenomenon can be effectively controlled and the braking response can be improved.

18 Claims, 6 Drawing Sheets

(56) References Cited

U.S. PATENT DOCUMENTS

| | | | | |
|---|---|---|---|---|
| 12,370,992 | B2 * | 7/2025 | Jang | F16D 65/183 |
| 2002/0026272 | A1 * | 2/2002 | Yamamoto | B60T 13/662<br>701/70 |
| 2008/0059023 | A1 * | 3/2008 | Ueno | B60T 13/746<br>188/1.11 E |
| 2016/0244034 | A1 * | 8/2016 | Huh | B60T 1/10 |
| 2022/0073045 | A1 * | 3/2022 | Nishiwaki | B60T 8/172 |

FOREIGN PATENT DOCUMENTS

| | | | |
|---|---|---|---|
| KR | 10-2017-0008094 | A | 1/2017 |
| KR | 10-2022-0089740 | A | 6/2022 |

* cited by examiner

[FIG. 1]
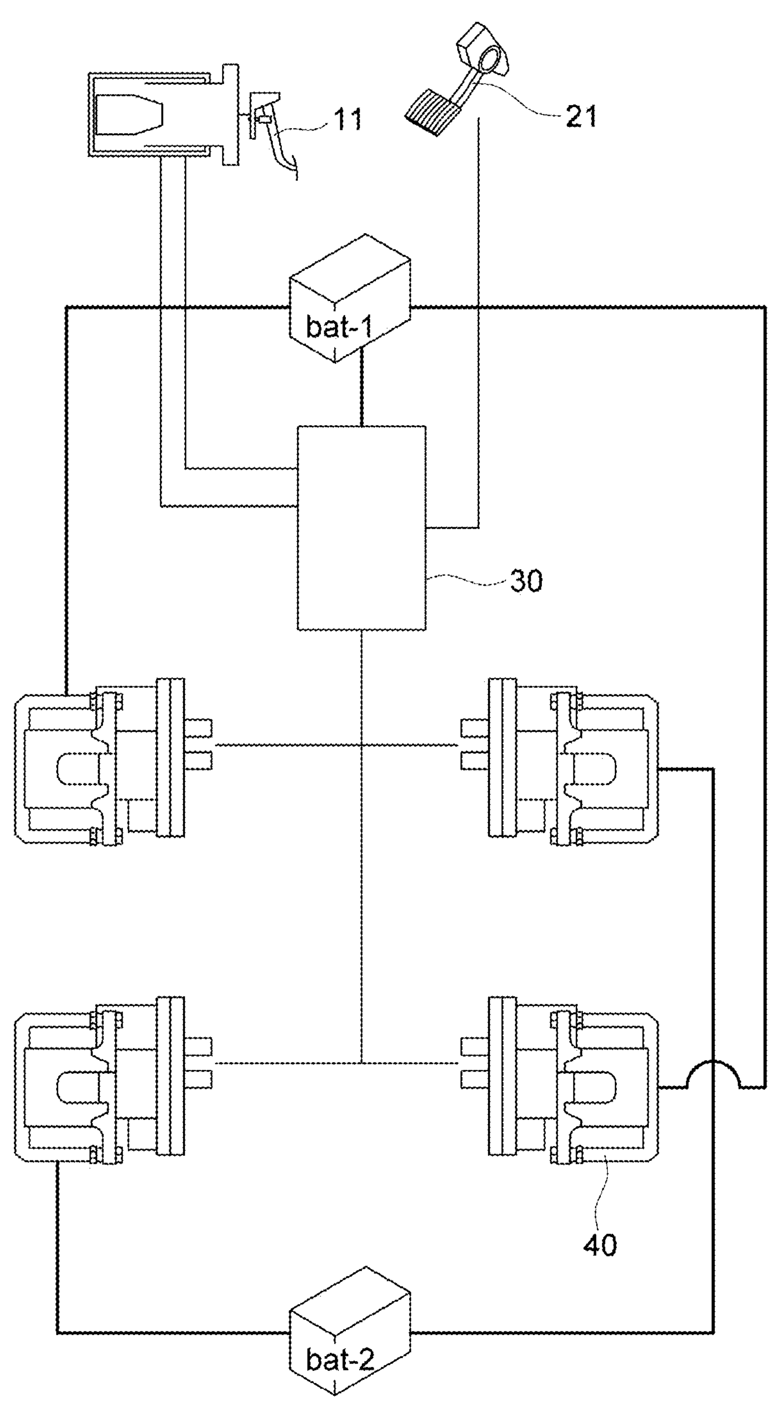

[FIG. 2A]
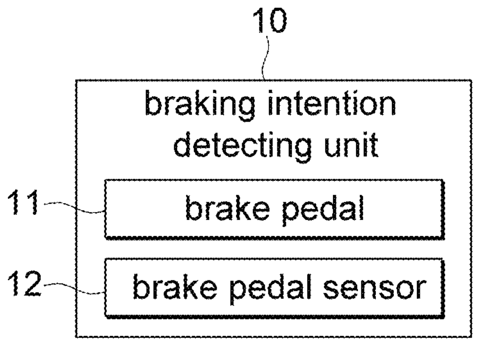
[FIG. 2B]
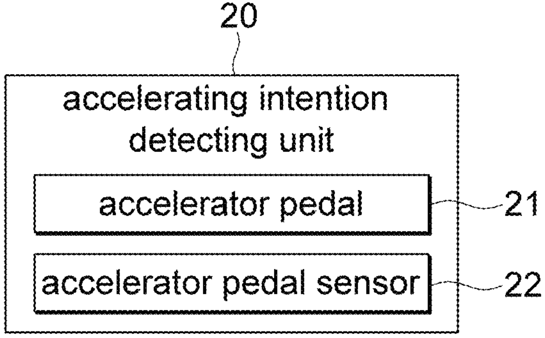

Figure 3:
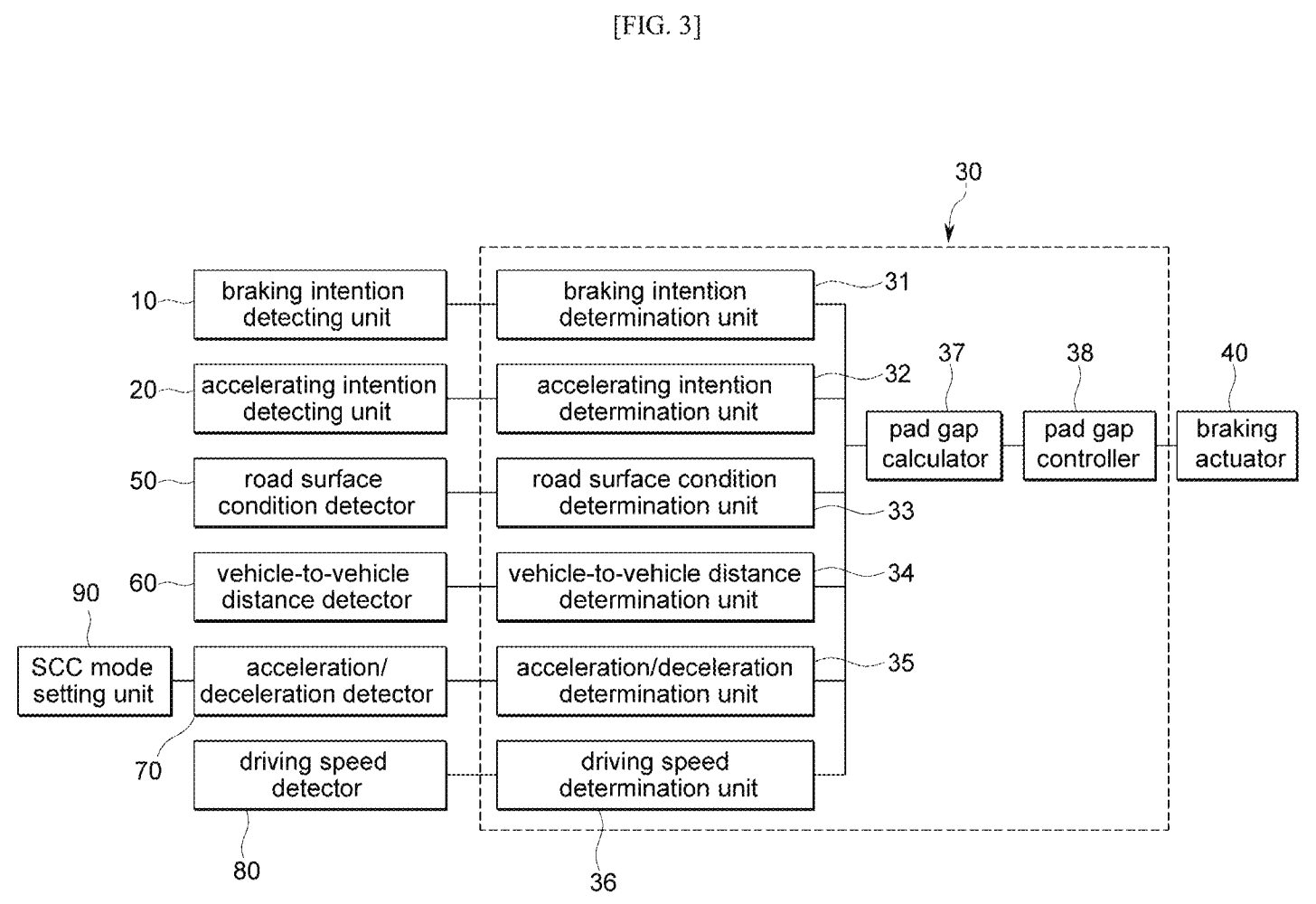

10 braking intention detecting unit
20 accelerating intention detecting unit
50 road surface condition detector
60 vehicle-to-vehicle distance detector
70 acceleration/deceleration detector
80 driving speed detector
90 SCC mode setting unit 31 braking intention determination unit
32 accelerating intention determination unit
33 road surface condition determination unit
34 vehicle-to-vehicle distance determination unit
35 acceleration/deceleration determination unit
36 driving speed determination unit 37 pad gap calculator
38 pad gap controller
40 braking actuator

[FIG. 4]
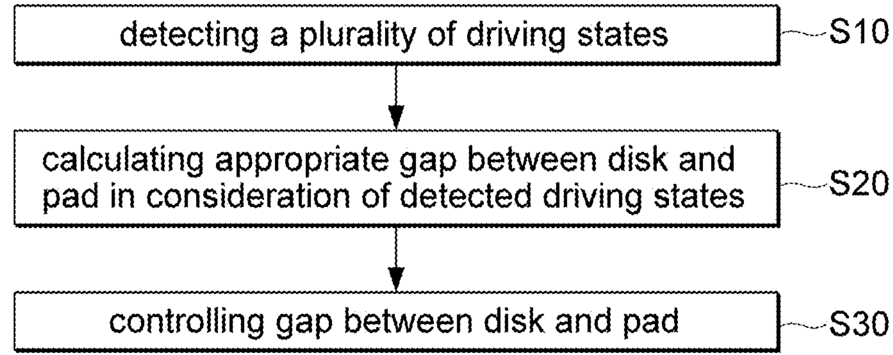
[FIG. 5]
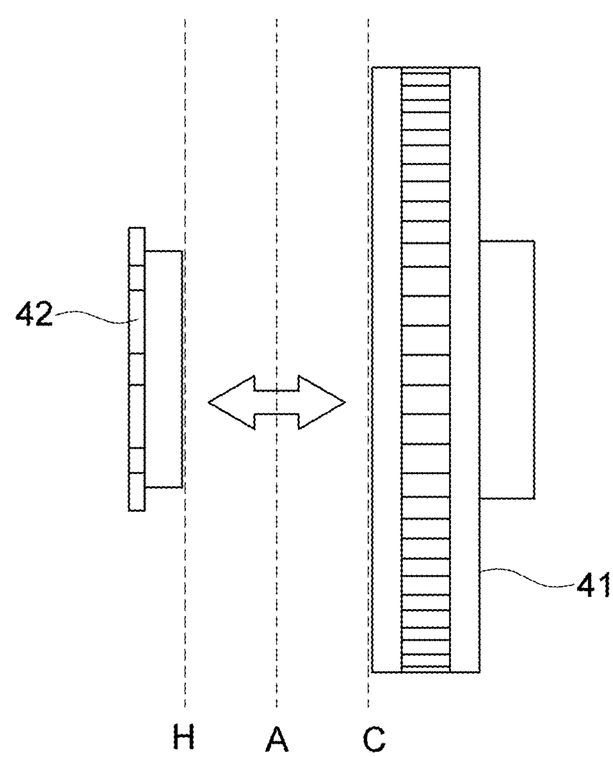

[FIG. 6]
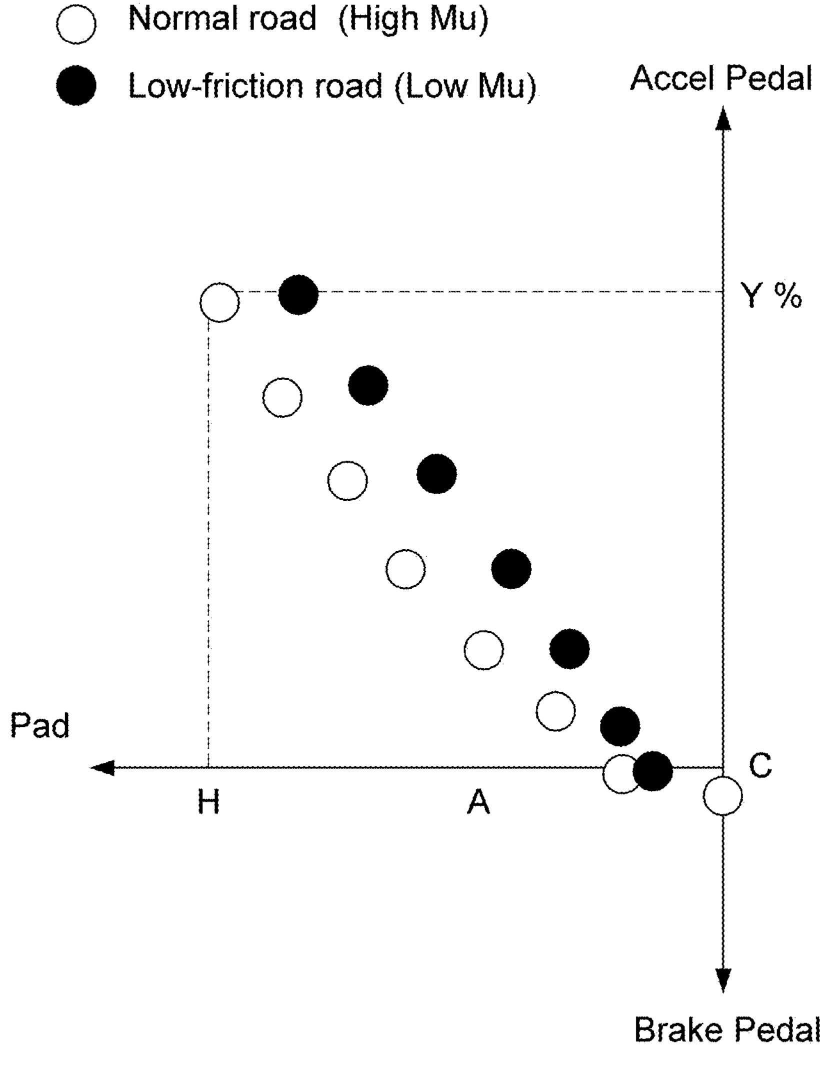

[FIG. 7]
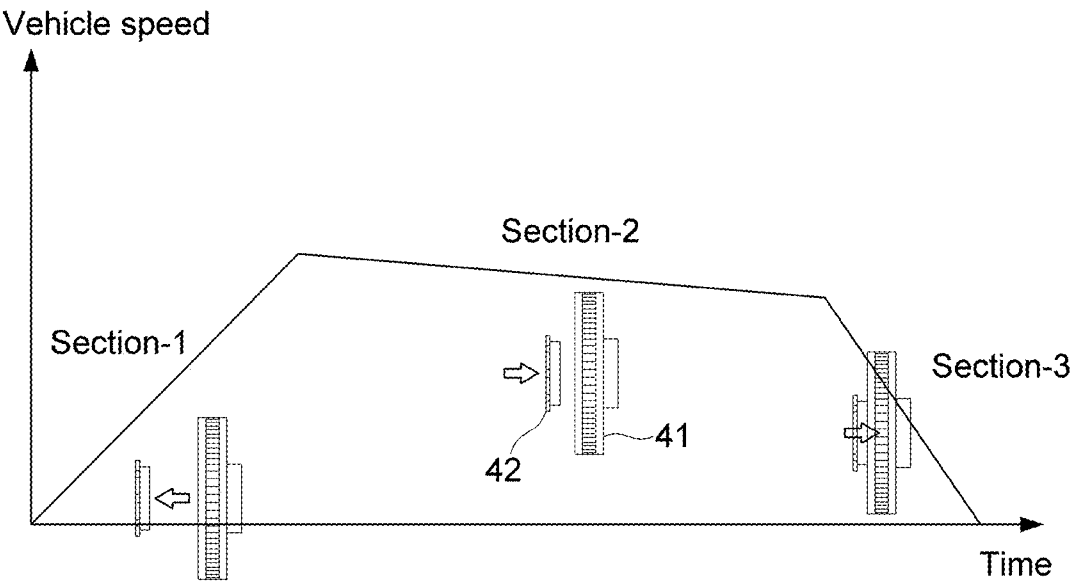

ZERO-DRAG CONTROL DEVICE OF EMB SYSTEM AND ZERO-DRAG CONTROL METHOD USING THE SAME

TECHNICAL FIELD

The present disclosure relates to a zero-drag control device and a zero-drag control method, and more particularly, to a zero-drag control device of an EMB (Electromechanical Brake) system, and a zero-drag control method using the same, which effectively control a drag phenomenon.

BACKGROUND

The EMB system is a component of a brake-by-wire (BbW) system, a brake device that generates braking force using an electric actuator instead of hydraulic pressure. Compared to existing hydraulic brake systems, the EMB system is environmentally friendly, has a high degree of freedom in design, and has excellent braking response and control performance.

In the EMB system, when an ECU (Electronic Control Unit), which receives electronic pedal information, drives a motor, a piston moves in an axial direction and presses a disk against a pad to implement braking. Like conventional braking systems, the EMB system also generates drag torque by contact between the disk and the pad due to its operating characteristics.

The drag torque is generated by the contact between the disk and the pad. The drag torque is generated due to frictional resistance between the disk and the pad, and is force acting in a direction opposite to a rotational force. Such a drag torque causes frictional heat generation, power loss, and fuel economy deterioration.

Therefore, while a vehicle drives, the drag torque needs to be reduced by increasing a gap between the disk and the pad, but this may lead to a decrease in braking response during sudden braking.

An example of an EMB system for reducing drag torque is described in Korean Patent No. 10-1669171 (hereinafter referred to as 'Prior Art Reference').

In the EMB system according to the Prior Art Reference, a normally closed type solenoid valve is installed on a hydraulic line connecting a reservoir and a cylinder of a pressure supply device for supplying hydraulic pressure for braking in an electric brake device to implement a complete closed circuit. Through this, it is possible to improve the fuel efficiency of a vehicle by allowing the piston in the cylinder to return completely when a brake pedal is released.

The drag phenomenon generated in the EMB system is unintentionally generated for various reasons, and there is a limit to effectively controlling the drag phenomenon caused by various reasons only with the EMB system according to the Prior Art Reference as described above.

PRIOR ART DOCUMENT

Patent Document (Patent Document 1) Korean Patent No. 10-1669171 (published on Oct. 25, 2016)

SUMMARY

In view of the above, the present disclosure provides a zero-drag control device of an EMB system and a zero-drag control method using the same, which can effectively reduce drag phenomena unintentionally generated for various reasons.

A zero-drag control device of an EMB (electromechanical brake) system, according to a preferred embodiment of the present disclosure, includes: a braking intention detecting unit that detects a driver's braking intention; an accelerating intention detecting unit that detects a driver's accelerating intention; a control unit that determines the braking intention and the accelerating intention transmitted respectively through the braking intention detecting unit and the accelerating intention detecting unit, and calculates a gap between a disk and a pad in consideration of both of the intentions; and a braking actuator for adjusting the gap between the disk and the pad under the control of the control unit.

The braking intention detecting unit includes: a brake pedal adapted to be depressed by a driver's foot; and a brake pedal sensor for detecting movement of the brake pedal and transmitting a detection signal of the movement of the brake pedal to the control unit.

The brake pedal sensor includes two or more brake pedal sensors.

The accelerating intention detecting unit includes: an accelerator pedal adapted to be depressed by a driver's foot; and an accelerator pedal sensor for detecting movement of the accelerator pedal and transmitting a detection signal of the movement of the accelerator pedal to the control unit.

The accelerator pedal sensor includes two or more accelerator pedal sensors.

The control unit includes: a pad gap calculator for calculating the gap between the disk and the pad in consideration of both the braking intention and the accelerating intention; and a plurality of pad gap controllers for receiving a calculation value from the pad gap calculator and each controlling an operation of the brake actuator provided for each wheel of a vehicle.

The zero-drag control device of the EMB system, according to the preferred embodiment of the present disclosure, further includes a road surface condition sensor for detecting a road surface condition and transmitting a detection signal of the road surface condition to the control unit.

The zero-drag control device of the EMB system, according to the preferred embodiment of the present disclosure, further includes a vehicle-to-vehicle distance detector for detecting a distance between a subject vehicle and a front vehicle while the subject vehicle is driving and transmitting a detection signal of the distance to the control unit.

The zero-drag control device of the EMB system, according to the preferred embodiment of the present disclosure, further includes an acceleration/deceleration detector for detecting acceleration/deceleration of a vehicle when a driving mode of the vehicle is an SCC (smart cruise control) mode, and transmitting a detection signal of the acceleration/deceleration of the vehicle to the control unit.

The zero-drag control device of the EMB system, according to the preferred embodiment of the present disclosure, further includes a driving speed detector for detecting a driving speed of a vehicle and transmitting a detection signal of the driving speed of the vehicle to the control unit.

A zero-drag control method according to a preferred embodiment of the present disclosure includes: (a) a step of detecting a driver's braking intention and a driver's accelerating intention through a braking intention detecting unit and an accelerating intention detecting unit, respectively, and transmitting detection signals of the braking intention and the accelerating intention to a control unit; (b) a step of determining the braking intention and the accelerating intention and calculating a gap between a disk and a pad in consideration of both of the intentions in the control unit; and (c) a step of controlling the gap between the disk and the pad in real time based on the calculated gap value in the control unit.

In the step (c), a point where a drag is zero is set as a reference point, a point where the pad contacts the disk is set as a contact point, and a position of the pad is controlled in real time between the reference point and the contact point.

The step (a) includes detecting a road surface condition through a road surface condition sensor and transmitting a detection signal of the road surface condition to the control unit, and in the step (b), the gap between the disk and the pad is calculated in consideration of the braking intention, the acceleration intention, and the road surface condition.

When the road surface condition is a low friction state, the gap between the disk and the pad is controlled to narrow.

The step (a) includes detecting a distance to a front vehicle through a vehicle-to-vehicle distance detector and transmitting a detection signal of the distance to the control unit, and in the step (b), the gap between the disk and the pad is calculated in consideration of the braking intention, the acceleration intention, and the distance to the front vehicle.

The gap between the disk and the pad is primarily controlled in consideration of the distance to the front vehicle, and the gap between the disk and the pad is secondarily controlled by additionally considering the braking intention and the accelerating intention.

When a driving mode of a vehicle is set to an SCC (smart cruise control) mode, it is determined in the step (b) that there is no braking intention through the brake pedal detected by the braking intention sensor and no accelerating intention through the accelerator pedal detected by the accelerating intention sensor, the step (a) includes detecting acceleration/deceleration of the vehicle through an acceleration/deceleration detector during the SCC mode driving and transmitting a detection signal of the acceleration/deceleration of the vehicle to the control unit, and the gap between the disk and the pad is calculated in consideration of the acceleration/deceleration in the step (b).

In the SCC mode, it is determined that there is the accelerating intention when the vehicle accelerates, and it is determined that there is the braking intention when the vehicle decelerates.

The step (a) includes detecting a driving speed of a vehicle through a driving speed detector and transmitting a detection signal of the driving speed of the vehicle to the control unit, and in the step (b), the gap between the disk and the pad is calculated in consideration of the braking intention, the acceleration intention, and the driving speed.

In the zero-drag control device of the EMB system and the zero-drag control method using the same, according to of the present disclosure, by adjusting the gap between the disk and the pad in consideration of not only the braking intention through the brake pedal but also the accelerating intention through the accelerator pedal, the drag phenomenon can be controlled effectively and the braking response can be improved.

In addition, by considering various driving conditions in addition to the braking intention through the brake pedal and the accelerating intention through the accelerator pedal, an optimal gap between the disk and the pad can be controlled in real time while considering both drag reduction and braking response.

BRIEF DESCRIPTION OF THE DRAWINGS

FIG. 1 is a diagram schematically showing the configuration of a zero-drag control device of an EMB system according to a preferred embodiment of the present disclosure.

FIG. 2A is a configuration diagram of a braking intention detecting unit.

FIG. 2B is a configuration diagram of an accelerating intention detecting unit.

FIG. 3 is a diagram showing the overall control structure of the zero-drag control device of the EMB system according to the preferred embodiment of the present disclosure.

FIG. 4 is a process chart showing a process of controlling zero-drag using the zero-drag control device of the EMB system according to the preferred embodiment of the present disclosure.

FIG. 5 is a diagram showing a relationship between a disk and a pad constituting a braking actuator.

FIG. 6 is a coordinate plane showing a change of a gap between the disk and the pad depending on road surface conditions.

FIG. 7 is a graph illustrating a change of the gap between the disk and the pad depending on a change in vehicle speed.

DETAILED DESCRIPTION

Hereinafter, a zero-drag control device of an EMB system and a zero-drag control method using the same according to a preferred embodiment of the present disclosure will be described in detail with reference to the accompanying drawings.

FIG. 1 in the accompanying drawings is a diagram schematically showing the configuration of a zero-drag control device of an EMB system according to a preferred embodiment of the present disclosure, and FIG. 2A is a configuration diagram of a braking intention detecting unit, and FIG. 2B is a configuration diagram of an accelerating intention detecting unit.

The zero-drag control device of the EMB system according to the preferred embodiment of the present disclosure can improve braking response while minimizing drag generation by determining a braking intention and an accelerating intention generated when a driver steps on a brake pedal and an accelerator pedal, and controlling a gap between a disk and a pad in real time in consideration of both intentions.

To this end, the zero-drag control device of the EMB system according to the preferred embodiment of the present disclosure includes a braking intention detecting unit 10, an accelerating intention detecting unit 20, a control unit 30, and a braking actuator 40.

The braking intention detection unit 10 is for detecting a driver's braking intention to reduce a speed of a vehicle, and includes a brake pedal 11 adapted to be depressed by a driver, and a brake pedal sensor 12 for detecting movement of the braking pedal 11 and transmitting a detection signal of the movement of the braking pedal 11 to the control unit 30.

The accelerating intention detecting unit 20 is for detecting a driver's accelerating intention to increase a speed of a vehicle, and includes an accelerator pedal 21 adapted to be depressed by the driver, and an accelerator pedal sensor 22 for detecting movement of the accelerator pedal 21 and transmitting a detection signal of the movement of the accelerator pedal 21 to the control unit 30.

A pedal travel sensor (PTS) may be used as the brake pedal sensor 12 and the accelerator pedal sensor 22. Each of the pedal sensors 12, 22 may be provided in a dual manner so that when one of them fails to function, the other functions. Each of the pedal sensors 12 and 22 may be provided three or more without being limited to the above.

The control unit 30 determines the braking intention and the accelerating intention transmitted from the braking intention detecting unit 10 and the accelerating intention detecting unit 20, respectively, and then calculating a gap between the disk and the pad in consideration of both intentions, and controlling the gap between the disk and the pad in real time according to the calculated value. The control unit 30 converts the braking intention and the accelerating intention into values required by an algorithm, and then calculates a target gap between the disk and the pad through the algorithm.

The brake actuator 40 is provided on each wheel side of the vehicle to individually brake each wheel. The brake actuator 40 includes a disk that rotates integrally with the wheel of the vehicle, and a pad that directly contacts the disk to stop the rotation of the disk.

In general, the disk and the pad are separated from each other while the vehicle is driving, but a drag phenomenon in which a part of the pad temporarily contacts the disk may occur due to a speed of the vehicle or other external factors. When the pad comes into contact with the disk while the vehicle is driving, heat is generated by friction and the speed of the vehicle temporarily decreases, so additional fuel consumption is needed to increase the speed, which inevitably reduces fuel efficiency.

In order to solve such problems, the zero-drag control device of the EMB system according to the present disclosure is characterized in that the gap between the disk and the pad is controlled in real time according to the driving situation. In particular, in order to realize effective zero-drag control and improved braking response at the same time, the gap between the disk and the pad is controlled in consideration of both the driver's braking intention and accelerating intention.

FIG. 3 in the accompanying drawings is a diagram showing the overall control structure of the zero-drag control device of the EMB system according to the preferred embodiment of the present disclosure.

As described above, since the drag phenomenon may be caused by various external factors while the vehicle is driving, the gap between the disk and the pad may be optimized by sufficiently considering the various external factors.

To this end, the zero-drag control device of the EMB system according to the preferred embodiment of the present disclosure may further include a road surface condition detector 50, and a vehicle-to-vehicle distance detector 60, an acceleration/deceleration detector 70, and a driving speed detector 80, in addition to the braking intention detecting unit 10 and the accelerating intention detecting unit 20.

In addition, the control unit 30 includes determination units that determine driving states through the detection signals transmitted from the respective detection units. That is, the control unit 30 may include a braking intention determination unit 31, an accelerating intention determination unit 32, a road surface condition determination unit 33, a vehicle-to-vehicle distance determination unit 34, an acceleration/deceleration determination unit 35, and a driving speed determination unit 36.

Detection and Determination of Braking/Accelerating Intentions

The braking intention detecting unit 10 detects a degree of the brake pedal 11 depressed by a driver and transmits it to the control unit 30, and the braking intention determination unit 31 determines a level of the driver's braking intention.

The accelerating intention detecting unit 20 detects a degree of the accelerator pedal 21 depressed by the driver and transmits it to the control unit 30, and the accelerating intention determination unit 31 determines a level of the driver's accelerating intention.

It can be determined that as the depressed degree of the brake pedal 11 or the accelerator pedal 21 increases, the braking intention or the accelerating intention increases.

Detection and Determination of Road Surface Condition

The road surface condition detection unit 50 detects whether the road surface is in a normal friction state or a low friction state. The case where the road surface is in the low-friction state includes a case where the road surface is wet from rain, a case where snow is piled up on the road surface, and a case where the road surface is frozen.

The road surface condition detection unit 50 may detect the road surface condition using an optical sensor or a tire slip rate. When the optical sensor is used as the road surface detection unit 50, an infrared sensor or a visible ray sensor may be used as the optical sensor. The optical sensor detects the road surface condition according to a reflectance of light reflected from the road surface.

The road surface condition determination unit 33 may receive a detection signal detected by the road surface condition detection unit 50 and set the road surface conditions to a dry state, a wet state, a snowy state, and an icy state. When the road surface condition is detected using the optical sensor, it is determined whether the current road surface condition corresponds to any one of the above states according to the reflectance of light.

In general, the closer the road surface condition is to the dry state, the better the vehicle's braking response, and the closer the road surface is to the icy state, the lower the vehicle's braking response. Therefore, it is necessary to control the gap between the disk and the pad depending on the road surface condition in terms of braking response as well as effective drag control.

The control of the gap between the disk and the pad depending on the road surface condition will be mentioned again in the description with reference to FIG. 6.

Detection and Determination of Vehicle-to-Vehicle Distance

The vehicle-to-vehicle distance detection unit 60 detects a distance between a subject vehicle and a front vehicle while the subject vehicle is driving using a front sensor provided in a front portion of the subject vehicle and transmits a detection signal of the distance to the control unit 30. The vehicle-to-vehicle distance determination unit 34 determines whether the distance to the front vehicle is sufficiently far or close according to the detection signal transmitted from the vehicle-to-vehicle distance detection unit 60. For example, states such as very dangerous, dangerous, safe, and very safe may be set in order of distance to the front vehicle.

In general, as the vehicle-to-vehicle distance increases, sufficient time for braking can be secured, so even if the gap between the disk and the pad is large, stable braking is possible. However, when the vehicle-to-vehicle distance is short, the time required for braking is not sufficiently secured, so braking response is more important than anything else. Therefore, when the vehicle-to-vehicle distance is close, the disk and the pad need to be in a close state before the driver steps on the brake pedal 11.

As described above, the zero-drag control device of the EMB system according to the preferred embodiment of the present disclosure is characterized by detecting various driving states while the vehicle is driving and controlling the gap between the disk and the pad to obtain optimal drag control and braking response in consideration of all driving states.

Among the various driving states, the distance to a front vehicle is the first or most important factor in controlling the gap between the disk and the pad. In particular, when the vehicle-to-vehicle distance is short (dangerous, proximity state), the vehicle-to-vehicle distance may be the most important consideration. For example, when the vehicle-to-vehicle distance is close, the gap between the disk and the pad is primarily controlled by first considering the vehicle-to-vehicle distance prior to considering the braking intention through the brake pedal 11 and the accelerating intention through the accelerator pedal 21, and the gap adjustment can be controlled secondarily by additionally considering the braking intention and the accelerating intention.

Detection and Determination of Acceleration/Deceleration

As the demand for driver's convenience and safety increases, a driver assistance system (DAS) that assists vehicle control based on information obtained through a sensor installed in a vehicle or communication is being applied.

An example of the driver assistance system is a smart cruise control (SCC) system which detects a relative speed and distance of a subject vehicle to a front vehicle and assists a driver by controlling acceleration/deceleration of the subject vehicle according to the driving situation.

When the driver selects a SCC mode by pressing a SCC mode setting unit 90 while the vehicle is driving, the acceleration/deceleration of the vehicle are automatically controlled without the driver's manipulation based on the relative speed and distance to the front vehicle detected through a sensor. Accordingly, in the SCC mode, the operation of the brake pedal 11 and the accelerator pedal 21 is stopped. That is, in the SCC mode, it can be seen that there is no braking intention through the brake pedal 11 and no accelerating intention through the accelerator pedal 21.

Therefore, in the zero-drag control device of the EMB system according to the present disclosure, then acceleration/deceleration detector 70 is provided to detect acceleration/deceleration of the vehicle and transmit the acceleration/deceleration signal to the control unit 30.

When the acceleration/deceleration signal detected by the acceleration/deceleration detector 70 is transmitted to the control unit 30, the acceleration/deceleration determination unit 35 determines a degree of acceleration/deceleration of the vehicle. That is, the acceleration/deceleration determination unit 35 determines an accelerating/decelerating intention depending on a degree of the acceleration/deceleration of the vehicle. The accelerating intention through acceleration can be seen as replacing the driver's accelerating intention through the accelerator pedal 21, and the braking intention through deceleration can be seen as replacing the driver's braking intention through the brake pedal 11.

Detection and Determination of Driving Speed

Since the pressure transmitted to a vehicle, the rotational speed of the wheels, and the vibration transmitted to the wheels vary according to the driving speed of the vehicle, when the disk and the pad are positioned at a certain gap, the drag phenomenon may occur differently depending on the driving speed. In addition, when the disk and the pad are maintained at the same gap, the braking response varies depending on the driving speed.

Therefore, it is necessary to efficiently control the drag phenomenon and improve braking response by controlling the gap between the disk and the pad in real time in consideration of the driving speed of the vehicle.

Accordingly, in the zero-drag control device of the EMB system according to the present disclosure, the driving speed detector 80 detects a driving speed of the vehicle and transmits a signal of the driving speed to the control unit 30, and the driving speed determination unit 36 determines the driving speed. A vehicle speed sensor may be used as the driving speed detector 80.

Pad Gap Calculation and Pad Gap Control

The control unit 30 includes a pad gap calculator 37 that calculates an appropriate gap between the disk and the pad in consideration of the driving states transmitted from the respective determination units. The pad gap calculator 37 calculates a gap by digitizing the information transmitted from each determination unit and reflecting them to a gap calculation algorithm.

In addition, the control unit 30 includes a pad gap controller 38 that controls the gap between the disk and the pad in real time by adjusting the operation of the braking actuator 40 according to the value calculated by the pad gap calculator 37. The brake actuators 40 are provided for each wheel, and the pad gap controller 38 is also provided for each wheel to control the corresponding brake actuator 40.

In the accompanying drawings, FIG. 4 is a process chart showing a process of controlling zero-rag using the zero-drag control device of the EMB system according to the preferred embodiment of the present disclosure, FIG. 5 is a diagram showing a relationship between the disk and the pad constituting the braking actuator, FIG. 6 is a coordinate plane showing a change of the gap between the disk and the pad depending on the road surface conditions, and FIG. 7 is a graph illustrating a change of the gap between the disk and the pad depending on a change in vehicle speed.

A zero-drag control method of the EMB system, according to a preferred embodiment of the present disclosure, includes a driving state detection step (S10) of detecting a plurality of driving states, a gap calculation step (S20) of calculating an appropriate gap between the disk and the pad in consideration of the detected driving states, and a gap control step (S30) of controlling the gap between the disk and the pad.

Driving State Detection Step (S10)

The driving states that can be detected in the driving state detection step (S10) may include, as described above, the braking intention through the brake pedal, the accelerating intention through the accelerator pedal, the road surface condition, the vehicle-to-vehicle distance, the braking/acceleration intention during the SCC mode, and the driving speed.

The detailed description of detecting the driving states in the respective detection units has been described above, so redundant description thereof will be omitted.

Gap Calculation Step (S20)

In the clearance calculation step (S20), the detection signals transmitted from the detection units to the control unit are determined by the determination units, and then the pad gap calculator 36 converts the information on each driving state into a numerical value and inputs the information to an algorithm of the control unit to calculate an optimum gap. The optimum gap is determined in consideration of both zero-drag and braking response.

As shown in FIG. 5, in the gap calculation step (S20), a pad position at a drag zero point where no drag occurs while the vehicle is driving is set as a reference point H (Home Position), and a relative position A of a pad 42 between the reference point H and a contact point C of a disk 41 is calculated in real time.

FIG. 6 shows the relationship between the road surface condition, the accelerating intention and the position of the pad. The (+) direction of the Y axis indicates the accelerating intention through the accelerator pedal, and the (−) direction of the X axis indicates the relative position A of the pad 42 from the contact point C of the disk. In the second quadrant surrounded by the X-axis and Y-axis, the relative positions A of the pad 42 according to the driver's accelerating intention are displayed, and the positions A on a normal road with a dry road surface and a low-friction road with a wet road surface are marked to be distinguished from each other.

Under the premise that the accelerating intention is the same, comparing the pad positions A on the normal road and the pad positions A on the low-friction road, it can be confirmed that the pad 42 is farther away from the contact point C and relatively close to the reference point H on the normal road compared to the low-friction road.

From this, it can be seen that since the braking response decreases as the road becomes slippery, the gap between the pad 42 and the disk 41 is kept narrow to enable rapid braking upon braking. That is, it can be confirmed that the braking response is an important factor to be considered on a slippery road. As a matter of course, even on the slippery road, it can be seen that the pad 42 moves farther away from the contact point C as the accelerating intention increases.

When the road is dry, since the braking response is relatively better than that of the slippery road, the position of the pad 42 may be determined with more emphasis on realizing zero-rag rather than braking response.

FIG. 6 shows an example in which the gap between the disk and the pad is adjusted in consideration of the accelerating intention and the road surface condition, and as shown in FIG. 6, it can be seen that the driving states are applied in conjunction with each other in the gap adjustment, rather than individually.

Gap Control Step (S30)

When the optimum gap is calculated in the gap calculation step (S30), each pad gap controller 38 adjusts the braking actuator 40 provided for each wheel to control the gap between the disk 41 and the pad 42 provided for each wheel.

An example in which the gap between the disk 41 and the pad 42 is controlled according to the vehicle speed change is shown in FIG. 7.

FIG. 7 shows, as a graph, a change in vehicle speed over time in a driving environment including an acceleration section Section-1, a section Section-2 in which neither the accelerator pedal nor the brake pedal is depressed after the acceleration section, and a braking section Section-3, and also shows a change in position of the pad 42 for each section as a picture.

In Section-1, the speed of the vehicle gradually increases over time, and the pad 42 gradually moves away from the disk 41.

In section-2, the speed of the vehicle gradually decreases over time, and the pad 42 approaches the disk 41 at a gradual rate.

In section-3, the speed of the vehicle rapidly decreases over time, and the pad 42 comes closer to the disk 41 at a relatively faster speed than in section-2, and then comes into close contact with the disk 41.

As described above, the zero-drag control device of the EMB system and the zero-drag control method using the same, according to the preferred embodiment of the present disclosure, have been described in detail with reference to the accompanying drawings, but the present disclosure is not limited to the above-described embodiment, and various modifications thereof may be made within the scope of the claims.

(Description of Reference Numerals)

| | |
|---|---|
| 10: braking intention detecting unit | 11: brake pedal |
| 12: brake pedal sensor | 20: accelerating intention detecting unit |
| 21: accelerator pedal | 22: accelerator pedal sensor |
| 30: control unit | 31: braking intention determination unit |
| 32: accelerating intention determination unit | |
| 33: road surface condition determination unit | |
| 34: vehicle-to-vehicle distance determination unit | |
| 35: acceleration/deceleration determination unit | |
| 36: driving speed determination unit | |
| 37: pad gap calculator | 38: pad gap controller |
| 40: braking actuator | 41: disk |
| 42: pad | 50: road surface condition detector |
| 60: vehicle-to-vehicle distance detector | |
| 70: acceleration/deceleration detector | |
| 80: driving speed detector | |
| 90: SCC mode setting unit | |

What is claimed is:

1. A zero-drag control device of an EMB (electromechanical brake) system, the device comprising:

a braking intention detecting unit that detects a driver's braking intention;

an accelerating intention detecting unit that detects a driver's accelerating intention;

a control unit that determines the braking intention and the accelerating intention transmitted respectively through the braking intention detecting unit and the accelerating intention detecting unit, and calculates a gap between a disk and a pad in consideration of both of the intentions; and a braking actuator for adjusting the gap between the disk and the pad under the control of the control unit, wherein the control unit includes:

a pad gap calculator for calculating the gap between the disk and the pad in consideration of both the braking intention and the accelerating intention; and a plurality of pad gap controllers for receiving a calculation value from the pad gap calculator and each controlling an operation of the braking actuator provided for each wheel of a vehicle.

2. The zero-drag control device of claim 1, wherein the braking intention detecting unit includes:

a brake pedal adapted to be depressed by a driver's foot; and a brake pedal sensor for detecting movement of the brake pedal and transmitting a detection signal of the movement of the brake pedal to the control unit.

3. The zero-drag control device of claim 2, wherein the brake pedal sensor includes two or more brake pedal sensors.

4. The zero-drag control device of claim 1, wherein the accelerating intention detecting unit includes:

an accelerator pedal adapted to be depressed by a driver's foot; and an accelerator pedal sensor for detecting movement of the accelerator pedal and transmitting a detection signal of the movement of the accelerator pedal to the control unit.

5. The zero-drag control device of claim 4, wherein the accelerator pedal sensor includes two or more accelerator pedal sensors.

6. The zero-drag control device of claim 1, wherein further comprising a road surface condition sensor for detecting a road surface condition and transmitting a detection signal of the road surface condition to the control unit.

7. The zero-drag control device of claim 1, further comprising a vehicle-to-vehicle distance detector for detecting a distance between a subject vehicle and a front vehicle while the subject vehicle is driving and transmitting a detection signal of the distance to the control unit.

8. The zero-drag control device of claim 1, further comprising an acceleration and deceleration detector for detecting acceleration and deceleration of a vehicle when a driving mode of the vehicle is an SCC (smart cruise control) mode, and transmitting a detection signal of the acceleration/deceleration of the vehicle to the control unit.

9. The zero-drag control device of claim 1, further comprising a driving speed detector for detecting a driving speed of a vehicle and transmitting a detection signal of the driving speed of the vehicle to the control unit.

10. A zero-drag control method using a zero-drag control device, comprising:

(a) a step of detecting the braking intention and the accelerating intention through a braking intention detecting unit and an accelerating intention detecting unit, respectively, and transmitting detection signals of the braking intention and the accelerating intention to a control unit;

(b) a step of determining the braking intention and the accelerating intention and calculating a gap between a disk and a pad in consideration of both intentions in the control unit; and (c) a step of controlling the gap between the disk and the pad in real time based on the calculated gap in the control unit, wherein the control unit includes:

a pad gap calculator for calculating the gap between the disk and the pad in consideration of both the braking intention and the accelerating intention; and a plurality of pad gap controllers for receiving a calculation value from the pad gap calculator and each controlling an operation of a braking actuator provided for each wheel of a vehicle.

11. The zero-drag control method of claim 10, wherein in the step (c), a point where a drag is zero is set as a reference point, a point where the pad contacts the disk is set as a contact point, and a position of the pad is controlled in real time between the reference point and the contact point.

12. The zero-drag control method of claim 11, wherein the step (a) includes detecting a road surface condition through a road surface condition sensor and transmitting a detection signal of the road surface condition to the control unit, and in the step (b), the gap between the disk and the pad is calculated in consideration of the braking intention, the acceleration intention, and the road surface condition.

13. The zero-drag control method of claim 12, wherein when the road surface condition is a low friction state, the gap between the disk and the pad is controlled to narrow.

14. The zero-drag control method of claim 11, wherein the step (a) includes detecting a distance to a front vehicle through a vehicle-to-vehicle distance detector and transmitting a detection signal of the distance to the control unit, and in the step (b), the gap between the disk and the pad is calculated in consideration of the braking intention, the acceleration intention, and the distance to the front vehicle.

15. The zero-drag control method of claim 14, wherein the gap between the disk and the pad is primarily controlled in consideration of the distance to the front vehicle, and the gap between the disk and the pad is secondarily controlled by additionally considering the braking intention and the accelerating intention.

16. The zero-drag control method of claim 11, wherein when a driving mode of a vehicle is set to an SCC (smart cruise control) mode, it is determined in the step (b) that there is no braking intention through the brake pedal detected by the braking intention sensor and no accelerating intention through the accelerator pedal detected by the accelerating intention sensor, the step (a) includes detecting acceleration and deceleration of the vehicle through an acceleration and deceleration detector during the SCC mode driving and transmitting a detection signal of the acceleration/deceleration of the vehicle to the control unit, and the gap between the disk and the pad is calculated in consideration of the acceleration/deceleration in the step (b).

17. The zero-drag control method of claim 16, wherein in the SCC mode, it is determined that there is the accelerating intention when the vehicle accelerates, and it is determined that there is the braking intention when the vehicle decelerates.

18. The zero-drag control method of claim 11, wherein the step (a) includes detecting a driving speed of a vehicle through a driving speed detector and transmitting a detection signal of the driving speed of the vehicle to the control unit, and in the step (b), the gap between the disk and the pad is calculated in consideration of the braking intention, the acceleration intention, and the driving speed.

* * * * *